Oct. 30, 1956 G. C. STURGES 2,768,605
INDICATING INSTRUMENT
Filed April 16, 1952
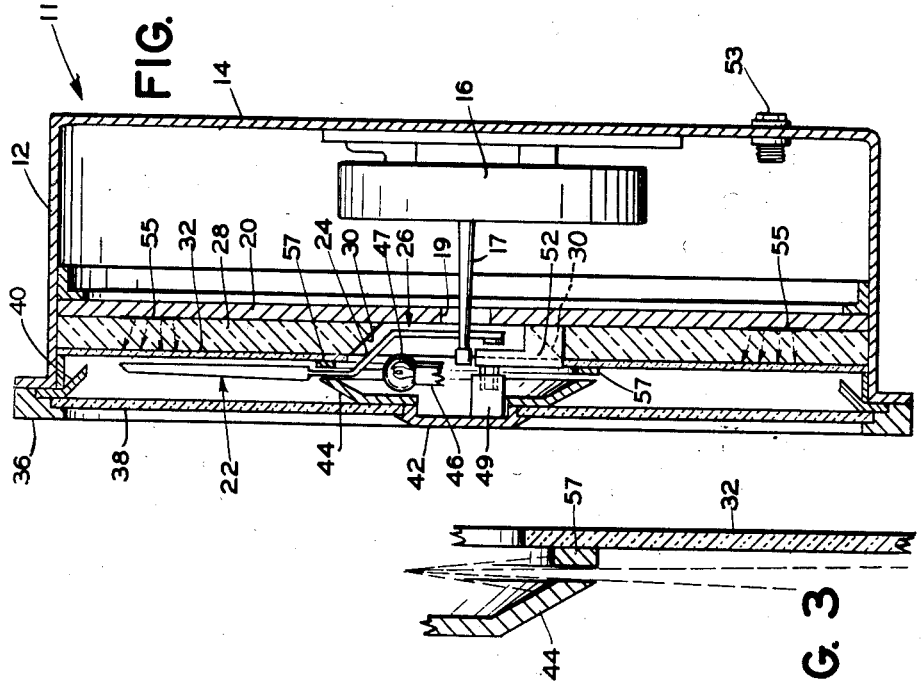
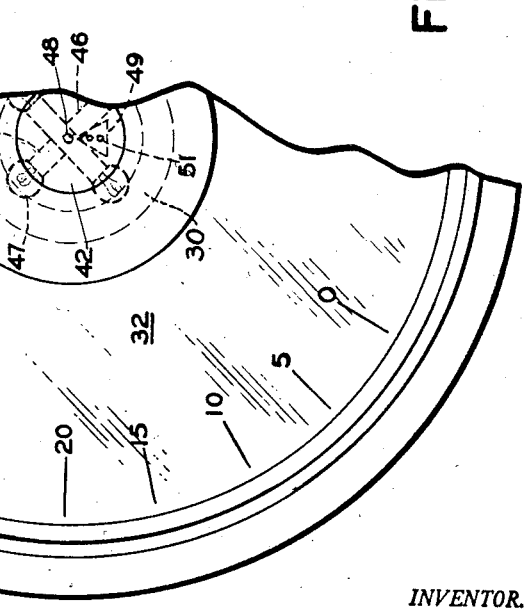
INVENTOR.
GEORGE C. STURGES
BY
C. R. Miranda
ATTORNEY

United States Patent Office 2,768,605
Patented Oct. 30, 1956

2,768,605

INDICATING INSTRUMENT

George C. Sturges, Bergenfield, N. J., assignor to Bendix Aviation Corporation, Teterboro, N. J., a corporation of Delaware Application April 16, 1952, Serial No. 282,639

4 Claims. (Cl. 116—129)

The present invention in general relates to indicating instruments and more particularly to the illumination of such instruments.

Proper illumination of indicating instruments, which are used in control compartments of mobile craft, becomes exceedingly important where a very low level of illumination must be maintained in the compartment and the operator must control the craft under "night-vision" conditions. In spite of the low general illumination level in the compartment, the instruments must be adequately illuminated so that the craft may be properly handled. This requirement is generally satisfied by some method of internal lighting. It is important in these cases that the amount of light which escapes from the instrument should be held to an absolute minimum, if not eliminated entirely.

In many instruments, direct rays of light from the source of illumination are employed to illuminate a pointer movable relative to a dial. Usually, the light rays are directed across the face of the dial and as a result strike the dial to produce an undesirable glare.

The present invention, therefore, contemplates a novel illuminated indicating instrument wherein there is provided center illumination of a transparent stationary dial and an associated movable indicator. A transparent light transmitting body is secured to the dial and is provided with an aperture which accommodates a source of illumination. Light rays are transmitted through the wall of the aperture and intercepted by means on the body which direct the rays toward the indicia. Means arranged in front of the dial distribute the light rays in a manner to cause a beam of light to impinge on the indicator in all positions thereof and also prevent direct rays of light from striking the dial, to minimize glare.

An object of the present invention, therefore, is to provide novel means to effect proper illumination of the dial and pointer of an indicating instrument.

Another object is to provide center illumination of a clock-type indicating instrument dial and its pointer.

Still another object is to provide an illuminated indicating instrument employing center illumination whereby a larger dial, finely graduated, may be obtained in the same space normally occupied by a smaller dial of an instrument which utilizes lights about the periphery of the dial.

A further object is to provide an illuminated indicating instrument wherein novel means are employed to minimize the glare on a dial face.

The above and other objects and advantages of the present invention will appear more fully hereinafter from a consideration of the detailed description which follows taken together with the accompanying drawing wherein one embodiment of the invention is illustrated.

In the drawing, wherein like reference characters refer to like parts throughout the several views:

Fig. 1 is a front elevational view of a portion of the illuminated indicating instrument embodying the present invention;

Fig. 2 is a side elevational view, partly in section, of the indicating instrument of Fig. 1; and Fig. 3 is a schematic diagram illustrating the operation of the light distributing means of the present invention.

Referring now to the drawings for a detailed description of the present invention, and more particularly to Figs. 1 and 2 wherein one embodiment hereof is clearly illustrated, an indicating instrument, generally designated by the numeral 11, is shown as comprising a casing 12 having a rear wall 14. Mounted on wall 14 is a condition responsive member 16, such as a Bourdon tube, which has a spindle 17 connected thereto for angular displacement in response to changes in the condition being measured. Spindle 17 extends through an opening 19 provided in a backing plate 20, which is formed of material such as aluminum, for example, and supports for rotation an indicator or pointer 22 of light-weight metal having an offset or inclined portion 24 arranged in an aperture 26 of an annular light transmitting member or body 28. Light transmitting member 28 is made of a colorless transparent material, such as acrylic resin, for example, highly polished on all sides and is secured to backing plate 20 in any suitable manner. Aperture 26 has a polished and beveled wall 30 which, as will be shown hereinafter, defines a light admitting surface for member 28 whereby light rays entering wall 30 are transmitted through the body.

A circular dial plate 32 having an aperture registering with aperture 26 is made of a colorless transparent material such as acrylic resin, for example, and is secured to member 28 in any suitable manner, such as by screws, not shown. Dial 32 is provided with indicia 34, such as graduations and numerals distributed around the periphery thereof, such indicia being rendered capable of illumination by rendering the background opaque and the indicia translucent so as to be illuminated by light directed into the body of the dial. The indicia 34 may be formed on the dial face by any of the conventional methods well known in the art, such as by photoengraving.

Secured to the front of casing 12, as by screws not shown, is a cover 36 which accommodates a transparent window 38 and a bezel member 40. Accommodated within an opening formed in window 38 and secured thereto is a cover plate or lamp housing 42 having a light deflecting wall 44 extending in the direction of dial 32. Lamp housing 42 has secured thereto a pair of arms each of which comprises a pair of sockets 46 for accommodating miniature electric lamps 47. The arms are fixed to each other and to housing 42 by a rivet 48. Lamps 47 are arranged in a manner to provide a source of illumination for each quadrant of the dial to thereby insure even and adequate illumination thereof. The electrical conductors (not shown) from sockets 46 are brought to an electrical socket plug 49 which is secured to housing 42 by rivets 51 (Figs. 1 and 2). A two pronged plug 52 fixedly supported by backing plate 20 and located in a slot cut in wall 30 of aperture 26 is provided for electrically connecting the lamps by way of electrical conductors (not shown) connected to an electrical connector 53 on wall 14 to a source of electrical energy, not shown. Plug 52 is so located that a minimum amount of shadows are cast upon pointer 22.

From Fig. 2 it may be readily seen that a portion of lamps 47 are located within aperture 26. The lamps are placed so that their filaments are at right angles to the dial and the maximum number of light rays therefrom will be directed toward the light transmitting body 28. As set forth hereinbefore, beveled wall 30 is a light admitting surface which receives light rays from the lamps. Wall 30 has a 45° bevel so that light rays passing therethrough are internally reflected and transmitted through body 28. While a bevel of 45° is well suited for the purposes of this invention, other desired inclinations may be utilized.

The underside of body 28, and specifically the area thereof directly behind indicia 34, is coated with white paint 55 which intercepts and reflects the transmitted light rays toward the indicia. Since the indicia comprises a translucent coating, light rays will be intercepted thereby and diffused so as to reach the eyes of an observer. The path of the light rays illuminating the indicia is illustrated by the arrows in Fig. 2.

Formed on the face of dial 32 and adjacent the edge of the aperture in the dial is an annular ring 57 which is located on the side of pointer 22 opposite the side where light deflecting wall 44 terminates. The wall and ring, in effect, provide a narrow slit-like passageway in which the straight portion of pointer 22 travels. The straight portion of pointer 22 has inclined surfaces which define a triangular structure, the apex and sides of which are viewable through window 38. Light rays from lamps 47 pass through the passageway defined by the edge of wall 44 and ring 57 and impinge on pointer 22 to be reflected from the inclined surfaces thereof into the eyes of an observer. From Fig. 1, it may be seen that light rays from at least two of lamps 47 will strike the inclined surfaces of pointer 22 in any position thereof relative to the dial to adequately illuminate the pointer. Furthermore, wall 44 and ring 57 define light distributing means which permit only those rays which are substantially in the plane of the straight portion of pointer 22 to leave the housing 42, whereby narrow beams of lights are directed onto the pointer.

Ring 57, in addition to the above, serves to minimize the glare on dial 32 in a manner best illustrated by Fig. 3 wherein a point source of illumination is considered. The radially extending light rays from the point source which travel in a direction to strike the dial are intercepted by ring 57 so that further travel thereof is prevented. In this manner, only the light rays which are traveling in a direction substantially coplanar with pointer 22 are permitted to escape between wall 44 and ring 57. Lamps 47 are positioned within instrument 11 in accordance with the above and consequently, direct rays of light are prevented from striking the dial to eliminate undesirable glare. Wall 44 also serves as a light shield to prevent direct rays of light from the lamps from being reflected into the eyes of an observer.

It will now be readily apparent that the present invention provides novel means for illuminating the dial and pointer of an indicating instrument and for preventing excessive glare on the dial. The novel combination of structure in providing a lamp housing secured directly to a cover window provides for ready access to the lamps without the need of disassembling the instrument.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In an illuminated indicating instrument, a dial structure including a light-transmitting body having a substantially central aperture formed therein, said dial structure having an opaque dial surface which is disposed adjacent to said body and in front thereof and which is provided with light-conducting indicia, the wall of said aperture being beveled to provide a light-admitting surface for said body, at least one source of light, means for positioning said light source so that said source is located at least partially in front of said dial surface to direct certain light rays from said source through said beveled wall for transmission through said body to illuminate said indicia, an indicator having visible portions to be illuminated, means extending into said aperture for supporting said visible portions in front of said dial surface for cooperation with said indicia, means for producing relative movement between said indicator and said indicia, and shields means for said light source including means projecting out in front of said dial surface for permitting other light rays coming directly from said source to pass across in front of said dial surface to strike said visible portions of the indicator to illuminate said visible portions directly and for intercepting light rays which come directly from said source and which are directed toward said dial surface, whereby glare due to said last-mentioned light rays is minimized.

2. In an illuminated indicating instrument, a dial structure including a light-transmitting body having an aperture formed therein, said dial structure having an opaque dial surface which is disposed adjacent to said body and in front thereof and which is provided with light-transmitting indicia, said body having a light-admitting surface, at least one source of light, means for positioning said light source so that said source is located at least partially in front of said dial surface to direct certain light rays from said source through said light-admitting surface for transmission through said body to illuminate said indicia, an indicator having visible portions to be illuminated, means extending into said aperture for supporting said visible portions in front of said dial surface for cooperation with said indicia, means for producing relative movement between said indicator and said indicia, and shield means for said light source including means projecting out in front of said dial surface for permitting other light rays coming directly from said source to pass across in front of said dial surface to strike said visible portions of the indicator to illuminate said visible portions directly and for intercepting light rays which come directly from said source and which are directed inwardly toward said dial surface, whereby glare due to said last-mentioned light rays is minimized.

3. In an illuminated indicating instrument, a dial structure including a light-transmitting body having an aperture formed therein, said dial structure having an opaque dial surface which is disposed adjacent to said body and in front thereof and which is provided with light-conducting indicia, at least one light-projecting device, means for positioning said light-projecting device adjacent to said light-admitting surface and at least partially in front of said dial surface to direct certain light rays from said light-projecting device through said light-admitting surface for transmission through said body to illuminate said indicia, an indicator having visible portions to be illuminated, means extending into said aperture for supporting said visible portions in front of said dial surface for cooperation with said indicia, means for producing relative movement between said indicator and said indicia, and shield means for said light-projecting device including a ring-like member having a portion projecting from said dial surface out in front of said dial surface for permitting other light rays coming directly from said light-projecting device to pass across in front of said dial surface to strike said visible portions of the indicator to illuminate said visible portions directly and for intercepting light rays which come directly from said light-projecting device and which are directed toward said dial surface, whereby glare due to said last-mentioned light rays is minimized.

4. In an illuminated indicating instrument, a dial structure including a light-transmitting body having a substantially central aperture formed therein, said dial structure having an opaque dial surface which is disposed adjacent to said body and in front thereof and which is provided with light-transmitting indicia, an indicator rotatable about an axis extending through said aperture, said indicator having visible portions to be illuminated which are disposed in front of said dial surface for movement with respect to said indicia, the wall of said aperture providing a light-admitting surface, at least one light source, means for supporting said light source partially within said aperture and partially in front of said dial surface so that certain light rays from said source pass through said light-admitting surface for transmission through said body to illuminate said indicia, said supporting means including a light-deflecting wall extending inwardly toward and terminating adjacent the outer side of said indicator, a ring-like member disposed on said dial surface adjacent the inner side of said indicator and said wall so that said indicator rotates therebetween, said member surrounding said aperture and having a portion which together with said wall defines a relatively narrow passageway through which passes a relatively narrow beam of other light rays directly from said source for projection across in front of said dial surface to strike said visible portions of the indicator to illuminate said visible portions directly, said ring-like member intercepting still other light rays directly from said source which are directed inwardly toward said dial surface, whereby glare due to said last-mentioned light rays is minimized, said wall intercepting still other light rays directly from said source which are directed outwardly toward the observer, whereby glare due to said last-mentioned light rays is minimized.

References Cited in the file of this patent

UNITED STATES PATENTS

| | | |
|---|---|---|
| 1,525,107 | Spencer | Feb. 3, 1925 |
| 1,917,079 | Adams | July 4, 1933 |
| 2,172,765 | Kollsman | Sept. 12, 1939 |
| 2,272,806 | Klein | Feb. 10, 1942 |
| 2,278,520 | Klein | Apr. 7, 1942 |
| 2,561,881 | Oetting | July 24, 1951 |
| 2,566,026 | Hughes | Aug. 28, 1951 |
| 2,595,973 | Neugass | May 6, 1952 |

FOREIGN PATENTS

| | | |
|---|---|---|
| 378,494 | Germany | July 16, 1923 |
| 827,715 | Germany | Jan. 14, 1952 |